July 14, 1970 W. B. CRUMP 3,520,727
GOLF BALL PICKER FOR DRIVING RANGE
Filed May 22, 1968 2 Sheets-Sheet 1

INVENTOR.
William B. Crump
BY
George B. White
Attorneys

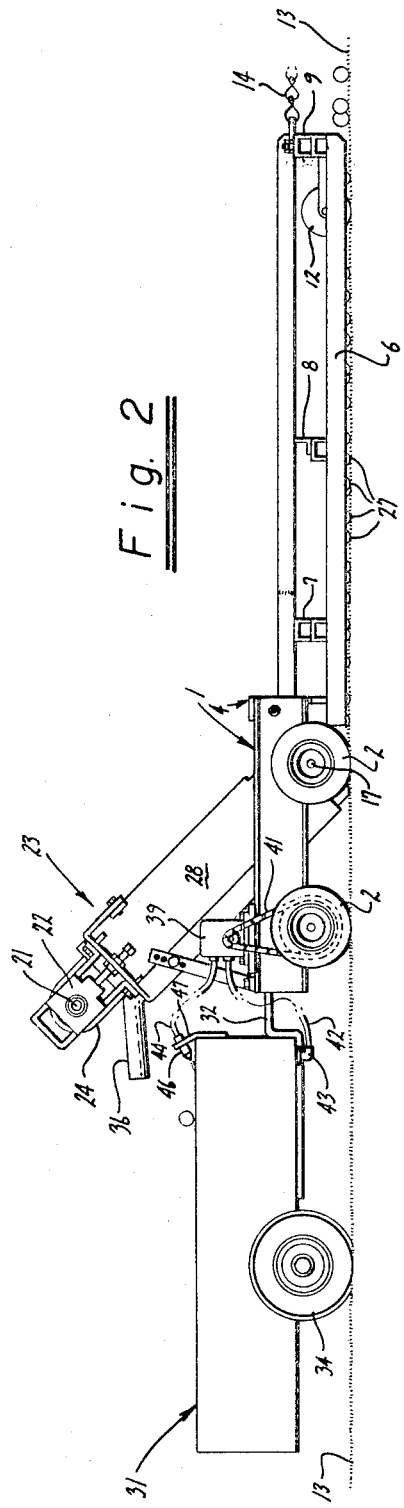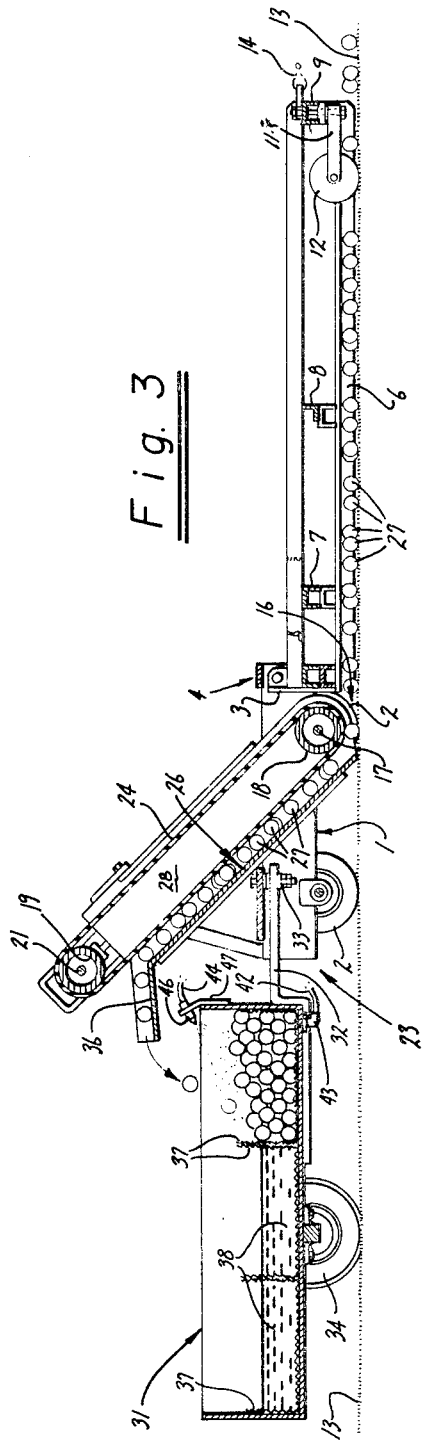

3,520,727
GOLF BALL PICKER FOR DRIVING RANGE
William B. Crump, 884 Quetta Court,
Sunnyvale, Calif. 94087
Filed May 22, 1968, Ser. No. 731,016
Int. Cl. B08b *1/02;* B60p *1/38*
U.S. Cl. 134—115               9 Claims

ABSTRACT OF THE DISCLOSURE

Forwardly divergent arms, held rigidly so as to form a throat at a conveyor frame, sweep the balls on the ground toward an inclined table. A belt conveyor superimposed on the inclined table grips the balls and rolls them up the table so that the balls drop into a container, in which latter there are ball-carrying cages immersed in water. The golf balls are washed during the collecting operation by the forward motion and rocking of the container; the unit is pulled by any suitable means such as by a motorized vehicle which is suitably tied to a crossbar connecting the divergent arms at their widest spaced end.

BRIEF DESCRIPTION OF THE INVENTION

Forwardly diverging arms with transverse connecting member at the wide spaced end extend from the frame of a wheeled carriage; caster wheels being provided on the forward connecting member to support the diverging arms spaced from the ground at a spacing less than the height of a golf ball so that the golf balls cannot escape under the diverging arms and are thus guided to the narrow throat at the wheeled carriage where the balls are driven up on an inclined table by an endles belt and dropped into ball receiving cages in a wheeled tank; a circular pump driven by a wheel of the wheeled carriage or frame circulates water through said container; the movement of the container of the carriage rocks the balls against each other in the water and thereby washes and cleans them.

DESCRIPTION OF FIGURES

FIG. 2 is a side view of the invention.
FIG. 3 is a longitudinal sectional view of the invention.

DETAILED DESCRIPTION

Figure 1:
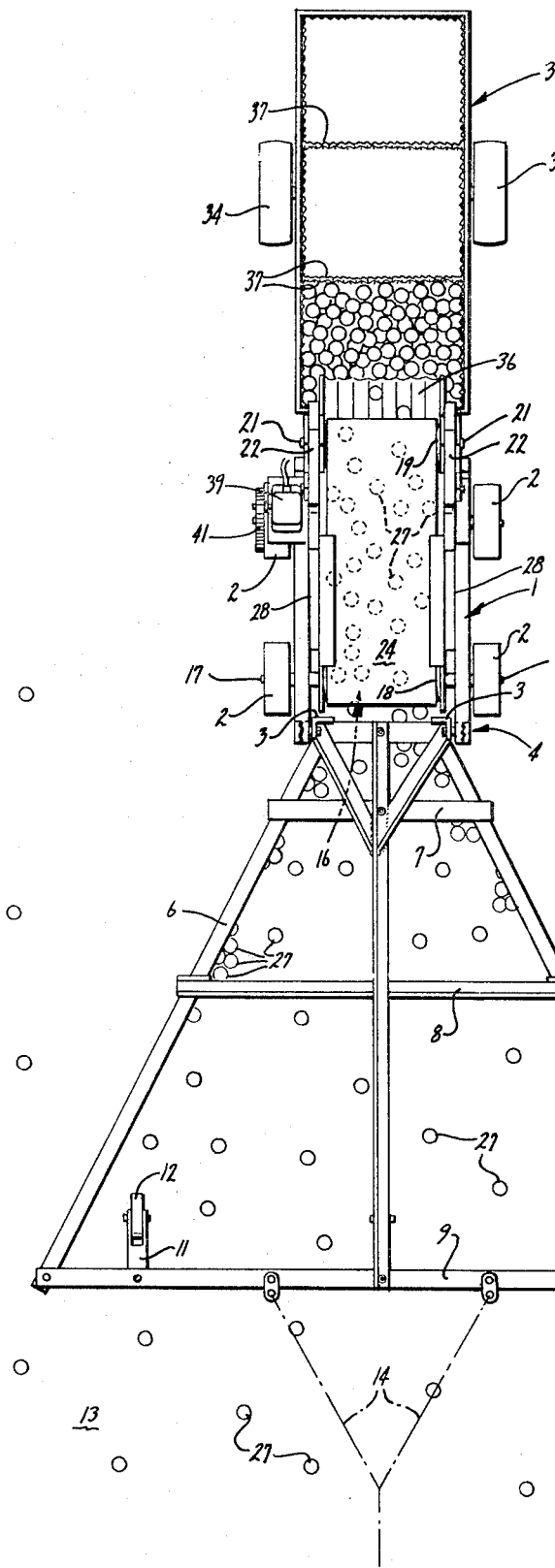
FIG. 1 is a top plan view of the invention.

A frame 1 is supported on wheels 2. On brackets 3 on the leading end 4 of the frame 1 are supported arms 6 which diverge forwardly from the forward end 4 of the carriage 1. Transverse bars 7 and 8 on the top of the diverging arms 6 space the arms 6 rigidly. The wider forward ends of the arms 6 are connected by a transverse spacer bar 9. A pair of caster brackets 11 are pivotally mounted on the crossbar 9 spaced from one another and carry caster wheels 12 which support the forward ends of the arm 6 at a predetermined spacing above the ground 13 to prevent golf balls from escaping under the arms 6. Suitable lines or cables 14 are connected to the front crossbar 9 and are suitably connected to a tow vehicle not shown.

The rearward or converging ends of the arms 6, mounted on the brackets 3 define a throat 16 under the carriage 1. On the forward wheel shaft axle 17 of the wheeled carriage 1 is mounted a suitable pulley 18. Another pulley 19 is suitably mounted on a shaft 21 in brackets 22 supported on the rear end 23 of the carriage 1. An endles belt 24 is played around the pulleys 18 and 19. Under the lower branch of the belt 24 is provided an inclined table 26 fixedly mounted on the carriage 1 spaced from said lower branch of the belt 24 at a distance tightly fitting the circumference of a golf ball 27. The brackets 22 are mounted on side plates 28 along each side of the endless belt 24 for confining the balls between the belt 24 and the table 26.

A wheeled container 31 is hitched by hitching member 32 to the carriage 1. The hitching member 32 is connected to the carriage 1 by suitable pivotal fasteners 33 located between the wheels 2 of the carriage 1 but nearer to the rear wheel 2. The wheel 34 of the wheeled container 31 is offset rearwardly from the center of the container 31 so that the center of gravity of the container 31 is located between the rear wheel 2 of the carriage 1 and the wheel 34 of the container 31, thereby the downward force applied by the weight of the container 31 on the carriage 1 is exerted forward of the rear wheel 2.

A spout 36 extends from the upper end of the table 26 and is above and inclined toward and over the top of the container 31. The container 31 is open at its top so that the balls fed upwardly on the table 26 roll down through the spout 36 and drop into the container 31. The container 31 has a plurality of ball-carrying wire baskets 37. The container 31 contains water 38.

A pump 39 is driven by suitable chain and sprocket transmission 41 by the rear wheel 2. The intake of the pump 39 is connected by a detachable, flexible conduit 42 to a bottom drain 43 of the container 31. The outlet of the pump 39 is connected by detachable flexible conduit 44 to a nozzle 46 mounted on a bracket 47 on the forward end of the container 31. Thus the water is continuously circulated through the container 31.

In operation the unit is suitably towed over the field of a driving range and as it so advances, the balls within the area between the diverging arms 6 are guided toward and into the throat 16 where they are picked up by the belt 24 and rolled up the inclined table 26 and dropped through the spout 36 into the container 31. The movement of the container 31 and the circulation of the water through the container 31 rubs the balls 27 against one another and causes the balls to spread over and into the rearward baskets whenever a forward backet 37 is filled. Such rubbing movement and water circulation for cleaning and washing the balls is accomplished by the movement of the carriage 1.

The gold ball picker herein described is simple in structure, comparatively inexpensive and positive in operation. It picks up all the balls within the area defined by the diverging arm 6 and leaves no balls on the field behind that area. The device requires no adjustment and can be easily manipulated by labor ordinarily available and is eminently adapted for its purposes.

What is claimed is:
1. In a golf ball picker for driving range,
  (a) a traveling frame having a leading end and a trailing end,
  (b) forwardly diverging arms extended from the frame ahead of said leading end,
  (c) means to space said arms from the ground to a distance less than the diameter of a golf ball,
  (d) connecting means whereby said forwardly diverging arms and said frame are pulled forwardly,
  (e) conveyor means extended upward from said frame from about said leading end of said frame for conveying balls gathered at said leading end upwardly,
  (f) said conveyor means including a conveyor having a branch thereof spaced from and generally parallel with said surface at such distance from said inclined surface as to roll the golf balls upwardly and rearwardly on said surface,
  (g) said conveyor means further including a guiding surface on said frame inclined upwardly and rearwardly from about the leading end of said frame,
  (h) and means at the trailing end of same frame to receive and collect the balls from said conveyor means.
2. The invention defined in claim 1 and
(i) said last mentioned means containing water and being adapted to rock the balls in said water during the travel of said frame.
3. The invention defined in claim 1 and
(i) means driven by the movement of said traveling frame to operate said conveyor.
4. The invention defined in claim 2 and
(j) means driven by the traveling motion of said frame to circulate the water in said collector means.
5. The invention defined in claim 1 and
(i) wheels on said collector means,
(j) wheels on said traveling frame,
(k) a hitching means connecting said collector means to said traveling frame and locating the center of gravity of said collector means between the wheels of said collector means and the wheels of said traveling frame.
6. The invention defined in claim 1 and
(i) removable perforated baskets in said collector for collecting said golf balls and holding the balls.
7. The invention defined in claim 1 and
(i) cross members to hold said diverging arms in diverging position thereby to form a throat at about the leading end of said traveling frame,
(j) a cross member connecting said diverging arms near the forward ends thereof,
(k) said arm spacing means including caster wheels mounted on said forward connecting cross member.

8. The invention defined in claim 7 and said conveying means including
(l) a table extended from said throat upwardly and rearwardly on said traveling frame so that the lower end of said table is spaced from the ground at a distance less than the diameter of a golf ball,
(m) a conveyor mounted on said traveling frame parallel with said table so that one branch of the conveyor engages and rolls the golf balls on said table upwardly and rearwardly,
(n) rolling support for said traveling frame,
(o) driving means connecting said rolling support to said conveyor for operating said conveyor upwardly and rearwardly along said table when the traveling frame is moved forwardly.
9. The invention defined in claim 8 and
(p) guide means at the upper end of said table extended above and over said collector means to discharge the balls into said collector means.

References Cited
UNITED STATES PATENTS

| | | | |
|---|---|---|---|
| 2,482,383 | 9/1949 | Traverso | 56—328 |
| 2,484,437 | 10/1949 | Wells | 214—356 |
| 2,643,754 | 6/1953 | Doak | 56—328 XR |
| 2,817,405 | 12/1957 | Pearson | 56—328 XR |

ALBERT J. MAKAY, Primary Examiner

U.S. Cl. X.R.

134—118, 133